United States Patent
Ferguson et al.

(10) Patent No.: US 10,214,291 B2
(45) Date of Patent: Feb. 26, 2019

(54) ENERGY ABSORBING ASSEMBLY FOR A SEAT

(71) Applicant: AMI Industries, Inc., Colorado Springs, CO (US)

(72) Inventors: Keith M. Ferguson, Colorado Springs, CO (US); Scott R. Patterson, Manitou Springs, CO (US); Jeff Benjamin, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 87 days.

(21) Appl. No.: 15/353,525

(22) Filed: Nov. 16, 2016

(65) Prior Publication Data

US 2018/0134393 A1    May 17, 2018

(51) Int. Cl.
*B60N 2/42*    (2006.01)
*B64D 11/06*    (2006.01)

(52) U.S. Cl.
CPC .......... *B64D 11/0619* (2014.12); *B60N 2/42* (2013.01); *B60N 2/4242* (2013.01)

(58) Field of Classification Search
CPC .......... B64D 11/0619; B60N 2/42; A47C 7/02
USPC ... 297/216.1, 216.13, 452.18, 452.19, 452.2, 297/452.55
See application file for complete search history.

(56) References Cited

U.S. PATENT DOCUMENTS

| | | | |
|---|---|---|---|
| 3,000,020 A | | 9/1961 | Lombard et al. |
| 3,466,733 A | * | 9/1969 | Barsam .................. B64C 25/64 29/896.93 |
| 4,526,421 A | | 7/1985 | Brennan et al. |
| 4,898,426 A | * | 2/1990 | Schulz .................. B64D 11/06 108/901 |
| 5,482,351 A | * | 1/1996 | Young .................. B60N 2/4242 297/216.1 |
| 5,662,376 A | * | 9/1997 | Breuer .................. B60N 2/4242 296/68.1 |
| 5,700,545 A | * | 12/1997 | Audi .................... B60N 2/4214 188/377 |
| 5,836,547 A | * | 11/1998 | Koch .................... B60N 2/4221 244/122 R |
| 6,027,171 A | * | 2/2000 | Partington ........... B60N 2/0232 297/452.18 |
| 6,062,642 A | | 5/2000 | Sinnhuber et al. |
| 6,142,563 A | * | 11/2000 | Townsend ............ B60N 2/4228 297/216.1 |

(Continued)

FOREIGN PATENT DOCUMENTS

| | | |
|---|---|---|
| EP | 3018056 | 5/2016 |
| WO | 1992006003 | 4/1992 |

OTHER PUBLICATIONS

European Patent Office, European Search Report dated May 2, 2018 in Application No. 17202125.5-1010.

*Primary Examiner* — Mark R Wendell
(74) *Attorney, Agent, or Firm* — Snell & Wilmer L.L.P.

(57) ABSTRACT

The energy absorbing assembly may include a seat frame having a base, a seat pan coupled to the seat frame, and a deformable member disposed substantially between the seat pan and the base of the seat frame. In various embodiments, the seat pan is configured to support a passenger in a seated position and the deformable member is configured to undergo plastic deformation in response to a first compressive load on the deformable member.

19 Claims, 4 Drawing Sheets

(56) References Cited

U.S. PATENT DOCUMENTS

| | | | | |
|---|---|---|---|---|
| 6,625,830 B2* | 9/2003 | Lampel | ................ | A47C 27/146 |
| | | | | 297/452.26 |
| 6,896,324 B1* | 5/2005 | Kull | .................... | B60N 2/4242 |
| | | | | 297/216.1 |
| 7,083,230 B2* | 8/2006 | Kull | .................... | B60N 2/4242 |
| | | | | 297/216.1 |
| 2013/0229038 A1* | 9/2013 | Marshall | .................. | B60N 2/24 |
| | | | | 297/216.1 |
| 2014/0060304 A1* | 3/2014 | Harmon | ................. | F41H 7/044 |
| | | | | 89/36.02 |
| 2015/0108814 A1* | 4/2015 | Meister | ............. | B64D 11/0646 |
| | | | | 297/391 |
| 2016/0122023 A1* | 5/2016 | Lichota | ............. | B64D 11/0689 |
| | | | | 297/216.1 |
| 2018/0017361 A1* | 1/2018 | Harmon | .................. | F41H 7/042 |

\* cited by examiner

ENERGY ABSORBING ASSEMBLY FOR A SEAT

FIELD

The present disclosure relates to systems and methods for energy absorption, and more specifically, to absorbing loads on vehicle seats.

BACKGROUND

Seats in vehicles, such as passenger seats in an aircraft cabin, generally have conventional padding and/or cushions that absorb energy and thereby attenuate force that would otherwise be transmitted to seated occupants. However, conventional padding and cushioning are typically unable to absorb sufficient energy to prevent injury to a seated occupant/passenger in the event of, for example, an aircraft crash landing. Moreover, such conventional padding and cushioning may weigh an excessive amount, thereby reducing operating efficiencies of, for example, the aircraft.

SUMMARY

In various embodiments, the present disclosure provides an energy absorbing assembly. The energy absorbing assembly may include a seat frame having a base, a seat pan coupled to the seat frame, and a deformable member disposed substantially between the seat pan and the base of the seat frame. In various embodiments, the seat pan is configured to support a passenger in a seated position and the deformable member is configured to undergo plastic deformation in response to a first compressive load on the deformable member.

In various embodiments, the deformable member includes a honeycomb structure. At least a portion of the honeycomb structure may be pre-crushed. In various embodiments, the honeycomb structure is made from aluminum. Columns of the honeycomb structure may be configured to be in direct contact with at least one of padding, cushioning, and upholstery. In various embodiments, the honeycomb structure includes columns extending in a direction substantially perpendicular to the seat pan. The plastic deformation may occur in a direction parallel to the columns in response to the first compressive load on the deformable member.

In various embodiments, the deformable member is positioned relative to the seat pan such that the deformable member is configured to be directly below an ischial tuberosity of the passenger in the seated position. The deformable member may have a first dimension, measured in a transverse direction parallel to the seat pan from one lateral side of the seat pan to another lateral side of the seat pan, that is proportional to a distance between a pair of sitting bones of the ischial tuberosity of the passenger in the seated position. In various embodiments, the first dimension of the deformable member is between about 4 inches and about 16 inches. In various embodiments, the first dimension of the deformable member is between about 5 inches and about 12 inches. In various embodiments, the first dimension of the deformable member is between about 6 inches and about 10 inches. the seat pan may have a second dimension, measured in the transverse direction, and a ratio of the first dimension to the second dimension may be between about ¼ and about ⅔.

In various embodiments, the seat pan includes or defines a cutout that corresponds to the deformable member. According to various embodiments, the first compressive load is less than about 1,500 lbf. The first compressive load, according to various embodiments, may be about 1,000 lbf. In various embodiments, the energy absorbing assembly further includes a wedge member disposed between the deformable member and the base of the seat frame.

Also disclosed herein, according to various embodiments, is a seat of an aircraft. The seat includes, according to various embodiments, seat frame having a base. The seat may further include a seat pan coupled to the seat frame and configured to support a passenger in a seated position. The seat pan, according to various embodiments, defines a cutout and a honeycomb structure disposed substantially between the cutout of the seat pan and the base of the seat frame. The honeycomb structure may be partially pre-crushed and may be configured to undergo plastic deformation in response to a first compressive load on the honeycomb structure.

Disclosed herein, according to various embodiments, is a method of manufacturing a seat of an aircraft. The method includes forming a cutout in a seat pan and coupling a deformable member to a base of a seat frame such that the deformable member is disposed substantially between the cutout of the seat pan and the base of the seat frame, according to various embodiments. The method may further include coupling a wedge member between the deformable member and the base of the seat frame.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
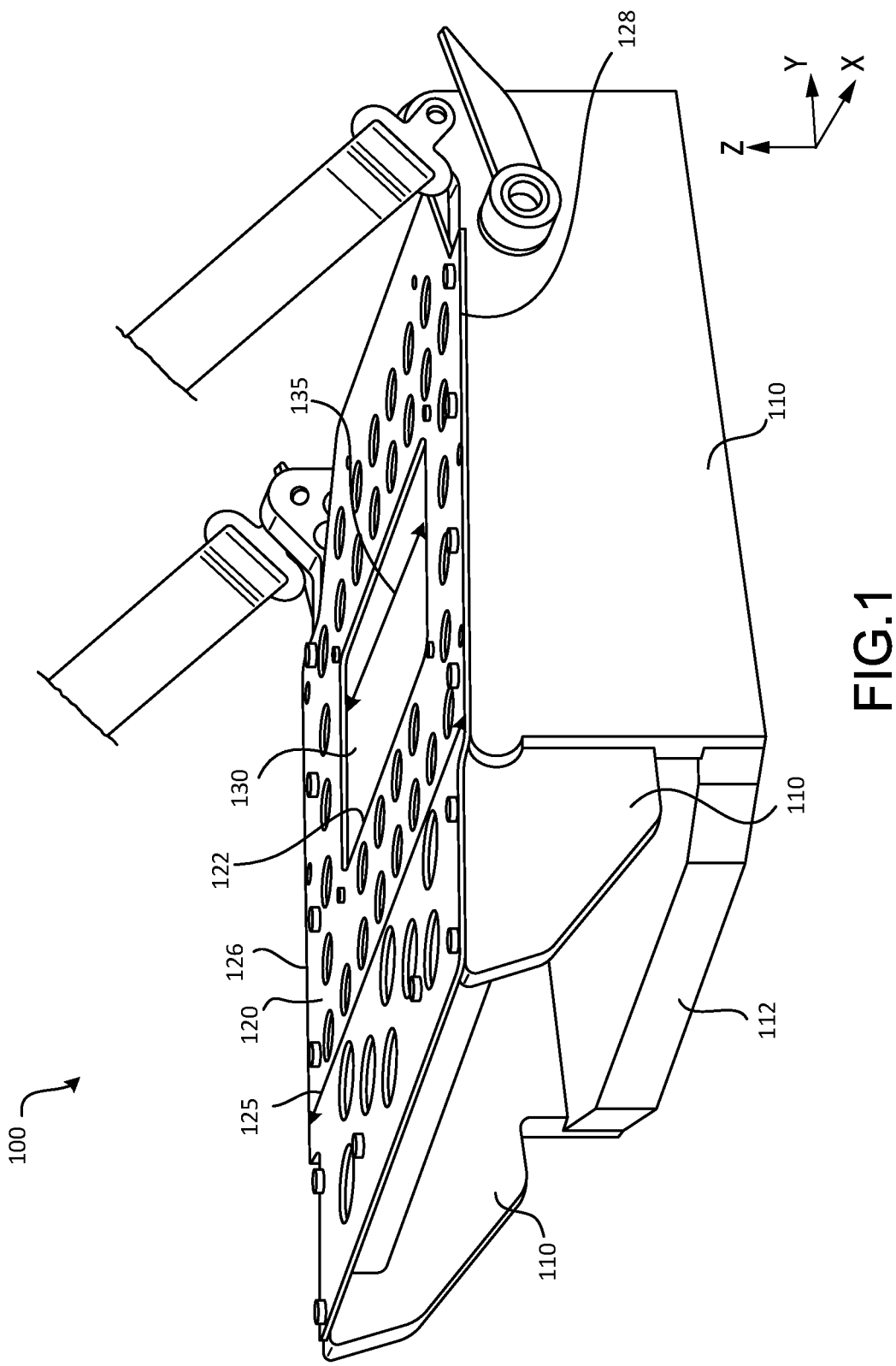
FIG. 1 illustrates a perspective view of an energy absorbing assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. As used herein, like numerals denote like elements.

In various embodiments and with reference to FIG. 1, an energy absorbing assembly 100 is disclosed for use on a seat of a vehicle. While numerous details and examples herein are described with reference to an aircraft and/or aircraft seats, the energy absorbing assembly 100 may be utilized in various other types of vehicles. Generally, the energy absorbing assembly 100 includes a seat frame 110, a seat pan 120 coupled to the seat frame 110, and a deformable member 130 disposed substantially between the seat pan 120 and a base 112 of the seat frame 110, according to various embodiments.

The seat pan 120 may be configured to support a passenger in a seated position. The seat pan 120 may include, or may be coupled to, one or more layers of padding, cushioning, upholstery, etc. In various embodiments, the seat pan 120 is substantially planar and extends substantially horizontally across a top portion of the seat frame 110. In other words, the seat pan 120 may be coupled to the seat frame 110 and may form a horizontal platform that supports (e.g., indirectly via various cushions, padding, upholstery, etc.) the passenger in the seated position. In various embodiments, the seat pan 120 supports the passenger during normal or standard operating conditions, but may bend or deform during high load, thus allowing the deformable member 130 to absorb/attenuate the load, as described in greater detail below.

In various embodiments, the deformable member 130 is configured to undergo plastic deformation in response to a first compressive load on the deformable member 130. That is, the deformation of the deformable member 130, according to various embodiments, absorbs energy and attenuates force that would otherwise be imparted to, for example, the passenger's body. Accordingly, the deformable member 130 disclosed herein is configured to prevent or at least tend to reduce the chance of injury to the passenger/occupant. The first compressive load may be the load threshold at which the deformable member 130 is designed to undergo plastic deformation. In various embodiments, the first compressive load is less than about 1,500 pound-force ("lbf") (6,600 Newtons). In various embodiments, the first compressive load is about 1,000 lbf (4,400 Newtons). The deformable member 130, in response to the first compressive load, may be configured to undergo unidirectional deformation in a direction that is substantially perpendicular to the seat pan 120.

XYZ axes are shown in FIG. 1 for convenience, with z extending perpendicular to the xy plane. In that regard, a measurement point displaced in the positive z axis direction from a given reference point may be considered "above" or on "top" of the given reference point. In contrast, a measurement point displaced in the negative z axis direction from the given reference point may be considered "below" or on "bottom" of the given reference point. In that regard, the terms "top" and "bottom" may refer to relative positions along the z axis. Thus, the downward direction of the plastic deformation of the deformable member 130 is in the negative z axis direction, according to various embodiments.

While the deformable member 130 is repeatedly described herein as being "below" the seat pan 120 or as being "substantially between" the seat pan 120 and the base 112 of the seat frame 110, the top portion/surface of the deformable member 130 may actually be flush with or may protrude above a top surface of the seat pan 120. That is, the seat pan 120 may include a cutout 122 or an opening and the deformable member 130 may extend at least partially upwards into the cutout 122. In various embodiments, the cutout 122 and the deformable member 130 have complementary shapes and/or dimensions. While the deformable member 130 disclosed herein is shown as having a rectangular, box-like geometry, the deformable member 130 may be cylindrical and/or may have other shapes and geometries. In various embodiments, the deformable member 130 may be made from a plurality of individual members that cumulatively form the shape/geometry of deformable member 130.

With reference to FIG. 1 and according to various embodiments, the deformable member 130 is positioned relative to the seat pan 120 such that the deformable member 130 may be configured to be directly below an ischial tuberosity of a passenger in a seated position. The ischial tuberosity includes the pair of "sitting bones" that extend posteriorly from the lower, anterior portion of the hip bone. When in a seated position, a majority of a passenger's weight is transferred through the ischial tuberosity. Accordingly, in various embodiments the deformable member 130 is only disposed below a minor portion of the seat pan 120 and thus is located in the xy plane so as to be below the ischial tuberosity of the passenger in order to attenuate force transferred via the ischial tuberosity of the passenger.

In various embodiments, the deformable member 130 has a first dimension 135, as measured in a transverse direction substantially parallel to the seat pan 120 from one lateral side 126 of the seat pan 120 to another 128 (i.e., along the x axis), that is proportional to a distance between the pair of sitting bones of the ischial tuberosity of the passenger in the seated position. That is, the first dimension 135 of the deformable member 130 may be specifically configured based on an average distance between the pair of sitting bones of the ischial tuberosity of anticipated passengers. In various embodiments, the first dimension 135 of the deformable member 130 is between about 4 inches (10.2 centimeters) and about 16 inches (40.6 centimeters). In various embodiments, the first dimension 135 of the deformable member 130 is between about 5 inches (12.7 centimeters) and about 12 inches (30.5 centimeters). In various embodiments, the first dimension 135 of the deformable member 130 is between about 6 inches (15.2 centimeters) and about 10 inches (25.4 centimeters). As used in this context only, the term "about" means plus or minus 0.5 inches. The seat pan 120 may have a second dimension 125, measured in the same transverse direction (i.e., along the x axis), and a ratio of the first dimension 135 of the deformable member 130 and the second dimension 125 of the seat pan 120 may be between about ¼ and about ⅔.

Figure 2:
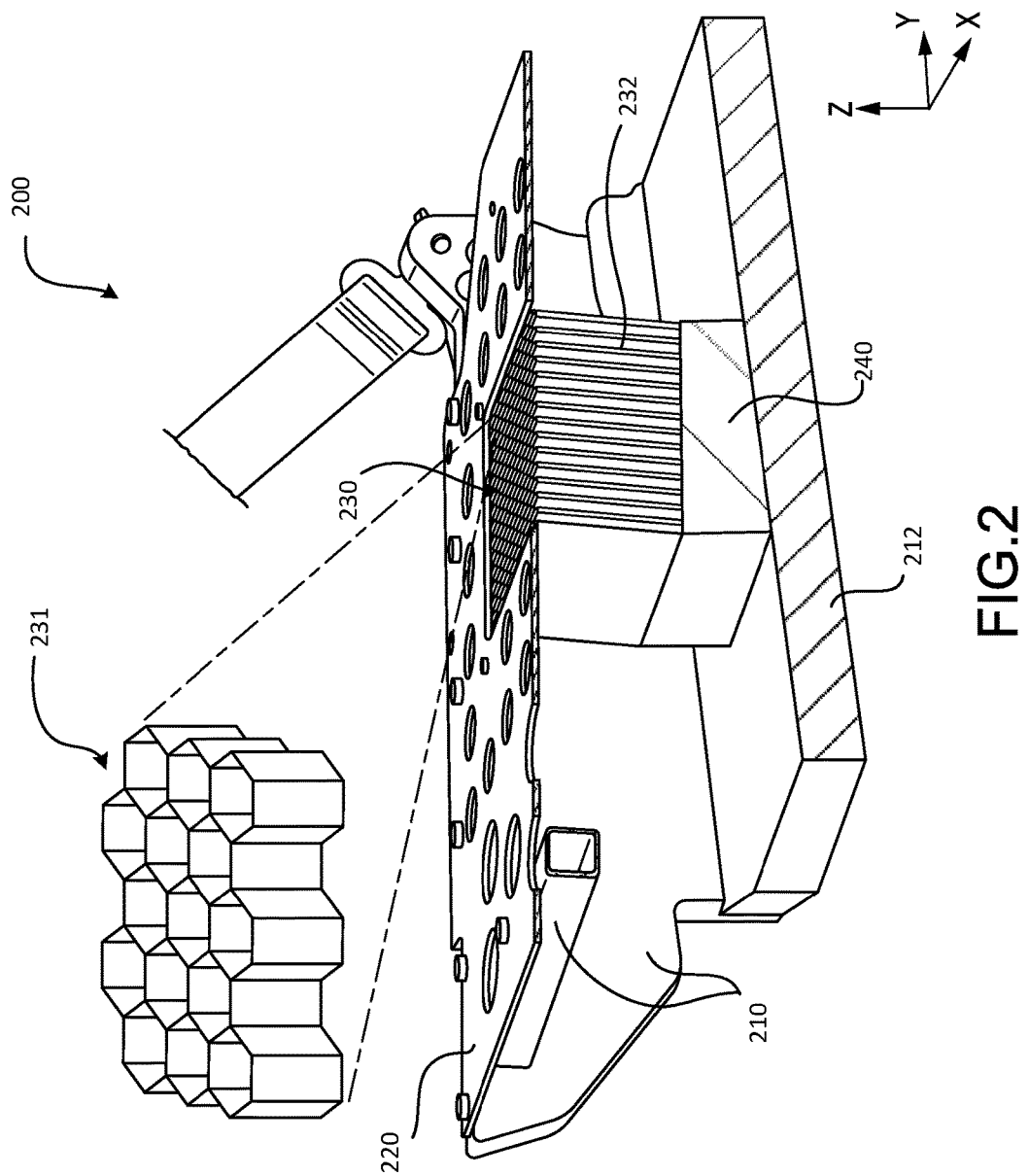
FIG. 2 illustrates a perspective cross-sectional view, including a magnified view, of an energy absorbing assembly, in accordance with various embodiments.

With reference to FIG. 2 and according to various embodiments, the deformable member 230 of the energy absorbing assembly 200 has a honeycomb structure 231. In various embodiments, the honeycomb structure may be made from a metallic material, such as aluminum or aluminum alloy, among others. The term "honeycomb structure" refers to arrays of hollow cells formed between substantially parallel walls. Accordingly, while the hollow cells/columns may have a hexagonal cross-sectional shape, the hollow cells/columns that form the "honeycomb structure" may have other polygonal cross-sectional shapes (e.g., rectangular). The columns 232 of the honeycomb structure may extend in a vertical direction substantially perpendicular to the seat pan 220 (i.e., the columns 232 may extend parallel to the z axis). In various embodiments, the honeycomb structure 231 may not have a face-sheet. That is, while honeycomb structures generally form part of a sandwich panel in which a top and/or a bottom face-sheet extend across the honeycomb cells, the present disclosure, according to various embodiments, includes a honeycomb structure 231 that does not have an accompanying face-sheet extending across the honeycomb cells. Said differently, the cells/columns 232 of the honeycomb structure 231 may be open to and may be configured to be in direct contact with at least one of padding, cushioning, and upholstery. In various embodiments, the honeycomb structure 231 that constitutes the deformable member 230 may be made of aluminum or an aluminum alloy, among others materials.

In various embodiments, the deformable member 230 is coupled to the base 212 of the seat frame 210. In various embodiments, the energy absorbing assembly 200 may also include a wedge 240 that is disposed between the deformable member 230 and the base 212 of the seat frame 210. Because the base 212 of the seat frame 210 and the seat pan 220 may be non-parallel to teach other, the wedge 240 may be implemented to account for the angled offset of the base 212 relative to the seat pan 220. In various embodiments, one or more fasteners may be utilized to retain the deformable member 230 in place relative to the base 212 of the seat frame 210 and the seat pan 220. In various embodiments, the deformable member 230 may be coupled to the base 212 of the seat frame 210 using an adhesive.

Figure 3:
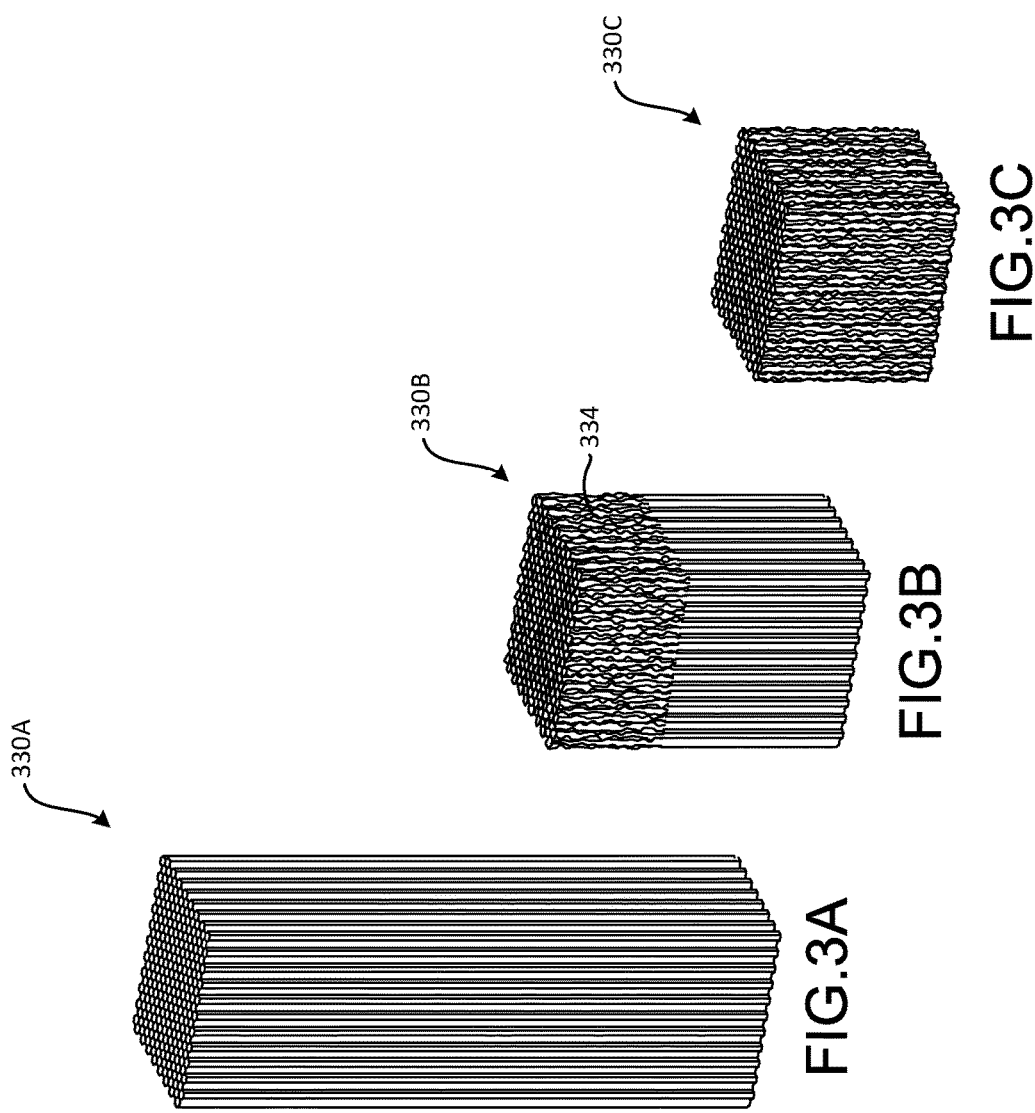
FIG. 3A illustrates a perspective view of a deformable member, in accordance with various embodiments.
FIG. 3B illustrates a perspective view of a deformable member having a pre-crushed portion, in accordance with various embodiments.
FIG. 3C illustrates a perspective view of a deformable member in a deformed state, in accordance with various embodiments.

FIGS. 3A-3C show various embodiments of the deformable member having the honeycomb structure described above. In various embodiments and with reference to FIG. 3B, a portion 334 of the honeycomb structure may be pre-crushed. In other words, a portion of the honeycomb structure may be bent, kinked, or otherwise deformed. The pre-crushed portion 334 may reduce the strength of the deformable member and/or may allow for a more uniform and steady energy absorption in response to the first compressive load. That is, the pre-crushed portion 334 may eliminate an initial spike in a stress-strain displacement curve that would otherwise be present if deformable member did not have a pre-crushed portion 334. In various embodiments, the deformable member 330B with the pre-crushed portion 334 may be sized to be disposed between the seat pan and the base of the seat frame and/or may be sized to extend at least partially upwards into the cutout 122 of the deformable member 330B. In various embodiments, FIG. 3A shows the deformable member 330A before it undergoes pre-crush. In various embodiments, FIG. 3C shows the deformable member 330C after undergoing maximum plastic deformation in response to the first compressive load.

Figure 4:
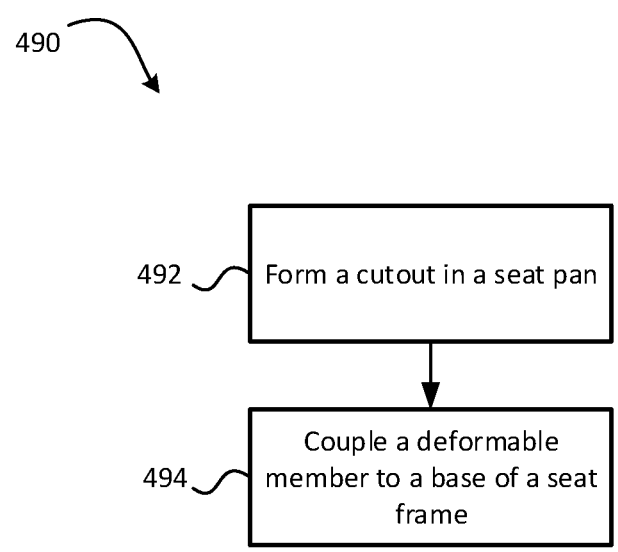
FIG. 4 illustrates a method of manufacturing an energy absorbing assembly, in accordance with various embodiments.

In various embodiments, and with reference to FIG. 4, a method 490 of manufacturing a seat of an aircraft is disclosed herein. The method 490 includes, according to various embodiments, forming a cutout in a seat pan at step 492 and coupling a deformable member to a base of a seat frame such that the deformable member is disposed substantially between the cutout of the seat pan and the base of the seat frame at step 494. In various embodiments, the method 490 may further include coupling a wedge member between the deformable member and the base of the seat frame.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy absorbing assembly comprising:
a seat frame comprising a base;
a seat pan coupled to the seat frame and configured to support a passenger in a seated position, the seat pan defining a cutout; and
a deformable member disposed substantially between the seat pan and the base of the seat frame, wherein the deformable member is configured to undergo plastic deformation in response to a first compressive load on the deformable member, wherein a portion of the deformable member is pre-crushed;
wherein the deformable member extends into the cutout and a first top surface of the deformable member is at least one of flush with or protruding above a second top surface of the seat pan.

2. The energy absorbing assembly of claim 1, wherein the deformable member comprises a honeycomb structure.

3. The energy absorbing assembly of claim 2, wherein the honeycomb structure comprises columns extending in a direction substantially perpendicular to the seat pan.

4. The energy absorbing assembly of claim 3, wherein the honeycomb structure does not have a top face-sheet, wherein the columns of the honeycomb structure are configured to be in direct contact with at least one of padding, cushioning, and upholstery.

5. The energy absorbing assembly of claim 4, wherein the plastic deformation occurs in a direction parallel to the columns in response to the first compressive load on the deformable member.

6. The energy absorbing assembly of claim 1, wherein the deformable member is made from aluminum.

7. The energy absorbing assembly of claim 1, wherein the deformable member is positioned relative to the seat pan such that the deformable member is configured to be directly below an ischial tuberosity of the passenger in the seated position.

8. The energy absorbing assembly of claim 7, wherein the deformable member has a first dimension, measured in a transverse direction parallel to the seat pan from one lateral side of the seat pan to another lateral side of the seat pan, that is proportional to a distance between a pair of sitting bones of the ischial tuberosity of the passenger in the seated position.

9. The energy absorbing assembly of claim 8, wherein the first dimension of the deformable member is between about 4 inches and about 16 inches.

10. The energy absorbing assembly of claim 8, wherein the first dimension of the deformable member is between about 5 inches and about 12 inches.

11. The energy absorbing assembly of claim 8, wherein the first dimension of the deformable member is between about 6 inches and about 10 inches.

12. The energy absorbing assembly of claim 1, wherein the deformable member has a first dimension, measured in a transverse direction parallel to the seat pan from one lateral side of the seat pan to another lateral side of the seat pan, wherein the seat pan has a second dimension, measured in the transverse direction, and a ratio of the first dimension to the second dimension is between about ¼ and about ⅔.

13. The energy absorbing assembly of claim 1, wherein the seat pan comprises an opening that corresponds to a size of the deformable member.

14. The energy absorbing assembly of claim 1, wherein the first compressive load is less than about 1,500 lbf.

15. The energy absorbing assembly of claim 1, wherein the first compressive load is about 1,000 lbf.

16. The energy absorbing assembly of claim 3, wherein the columns of the honeycomb structure are oblique relative to the base of the seat frame, wherein the energy absorbing assembly further comprises a wedge member disposed between the honeycomb structure and the base of the seat frame to account for an angled offset of the seat pant relative to the base.

17. A seat of an aircraft, the seat comprising:
a seat frame comprising a base;
a seat pan coupled to the seat frame and configured to support a passenger in a seated position, the seat pan defining a cutout;
a honeycomb structure disposed substantially between the cutout of the seat pan and the base of the seat frame, wherein the honeycomb structure is configured to undergo plastic deformation in response to a first compressive load on the honeycomb structure in a direction through the cutout, the honeycomb structure comprising columns extending in a direction substantially perpendicular to the seat pan; and
a wedge member disposed between the honeycomb structure and the base of the seat frame to account for an angled offset of the seat pant relative to the base;
wherein the columns of the honeycomb structure are oblique relative to the base of the seat frame.

18. A method of manufacturing a seat of an aircraft, the method comprising:
forming a cutout in a seat pan;
coupling a deformable member to a base of a seat frame such that the deformable member is disposed substantially between the seat pan and the base of the seat frame; and
coupling a wedge member between the deformable member and the base of the seat frame to account for an angled offset of the seat pan relative to the base;
wherein the deformable member extends into the cutout and a first top surface of the deformable member is at least one of flush with or protruding above a second top surface of the seat pan.

19. The method of claim 18, wherein the deformable member comprises a honeycomb structure having columns, wherein the honeycomb structure does not have a top face-sheet, wherein coupling the deformable member to the base of the seat frame such that the deformable member is disposed substantially between the seat pan and the base of the seat frame comprises positioning the deformable member such that the columns of the honeycomb structure are in direct contact with at least one of padding, cushioning, and upholstery.

* * * * *